(12) United States Patent
Ade et al.

(10) Patent No.: US 6,341,542 B1
(45) Date of Patent: Jan. 29, 2002

(54) AUTOMATIC SCREWING DEVICE

(75) Inventors: Reiner Ade, Muensing; Wolfgang Listmeier, Lenggries-Schlegldorf; Bolger Wolf, Geretsried, all of (DE)

(73) Assignee: Weber Schraubautomaten GmbH, Wolfratshausen (DE)

( * ) Notice: Subject to any disclaimer, the term of this patent is extended or adjusted under 35 U.S.C. 154(b) by 0 days.

(21) Appl. No.: 09/284,091

(22) PCT Filed: Oct. 11, 1997

(86) PCT No.: PCT/EP97/05597

§ 371 Date: Apr. 7, 1999

§ 102(e) Date: Apr. 7, 1999

(87) PCT Pub. No.: WO98/16352

PCT Pub. Date: Apr. 23, 1998

(30) Foreign Application Priority Data

Nov. 10, 1996 (DE) .......................................... 196 42 048

(51) Int. Cl.[7] .............................................. B25B 23/04
(52) U.S. Cl. ........................................ 81/57.37; 81/433
(58) Field of Search ................................. 81/57.37, 433

(56) References Cited

FOREIGN PATENT DOCUMENTS

| DE | 3333427 | * | 4/1985 |
| EP | 0 284 755 | * | 10/1988 |

* cited by examiner

Primary Examiner—D. S. Meislin
(74) Attorney, Agent, or Firm—Townsend and Townsend and Crew LLP (57) ABSTRACT

An automatic screwing device, especially a hand screwdriver, consisting of a screwdriver and a collet to hold a secured protruding screw. The screwdriver is coupled to an actuating device so that it can rotate and move forward in relation to the collet. The actuating device has a first threaded element which can be driven rotationally and connected to the screwdriver and at least a second threaded element which is connected to the collet and interacts with the first threaded element. By providing two different thread pitches on the first and/or second element the screwdriver can advance at two different speeds while rotational speed of the first element remains the same.

35 Claims, 5 Drawing Sheets

AUTOMATIC SCREWING DEVICE

BACKGROUND OF THE INVENTION

1. Field of the Invention

The invention relates to an automatic screwing device with automatic screw supply, in particular a hand screwdriver of this kind, comprising a screw driving tool and a collet for holding a secured, protruding screw, in which the screw driving tool is coupled to an actuating device for the generation of a rotary movement and a feed of the screw driving tool, which takes place relative to the collet, wherein the actuating device has a rotationally drivable, first threaded element, which is connected to the screw driving tool and has a first thread, and also at least one second threaded element, which stands in working engagement with the first threaded element via the first thread.

2. Description of the Prior Art

In such known automatic screwing devices, the actuating device is, for example, driven by means of an air motor to produce the rotary movement and by a pneumatic piston-in-cylinder unit to produce the feed.

Disadvantageous in the use of air motors and pneumatic piston-in-cylinder units is the fact that two different actuating devices are required to produce the rotary movement and the feed, namely an air motor and a pneumatic piston-in-cylinder unit, which is naturally associated with additional manufacturing costs.

Furthermore, it is of disadvantage that the operation of the two actuating units is, on the one hand, associated with a relatively loud noise, and, on the other hand, that the air which acts on the motor and the piston must be oiled, which often leads to undesired contamination as a result of the not completely avoidable oil spray.

An automatic screwing device is known from EP-A-0 284 755, in which the rotary drive and the feed are driven from a single drive shaft. A first threaded element in the form of a splined shaft is rotationally fixed, but axially displaceable within the drive shaft. The splined shaft is connected via a thread to a second threaded element in the form of a spindle such that, on rotation of the splined shaft via the drive shaft, the splined shaft executes an axial movement together with the screw driving tool secured thereon. Disadvantageous with this automatic screwing device is the fact that, with a constant rotation of the drive shaft, the return travel of the screw driving tool for the purpose of a renewed automatic screw supply involves a comparatively long dead time.

SUMMARY OF THE INVENTION

An object of the invention is to further develop an automatic screwing device of the initially named kind, so that it can be manufactured less expensively, in particular with both the rotary movement and also the feed being produceable by a unitary actuating device. At the same time, a high working speed of the automatic screwing device should be made possible.

In accordance with the invention this object is satisfied in that the second threaded element is connected to the collet, and in that two different feed speeds can be produced for a constant speed of rotation of the first threaded element by the provision of two different thread pitches at the first thread and at a second thread, which is provided on the first threaded element or on the second threaded element.

Thus, in accordance with the invention, in distinction to the prior art, the feed movement is ultimately also derived from a rotary movement, and both the rotary movement and also the feed movement can be produced by means of two cooperating threaded elements. In this arrangement, different speeds of advance can be produced through the provision of two different thread pitches. These different speeds of advance are of substantial importance for an operation of the automatic screwing device taking place with a higher cycle rate, since, in automatic screwing devices with an automatic screw supply, measures must be taken to ensure that the screw driving tool can be retracted very rapidly out of the region of the collet after a screwing procedure has been completed in order to avoid a newly supplied screw colliding with the screw driving tool during the supply procedure. After the new screw has been supplied, measures must again be taken quickly to ensure that the screw driving tool is moved into the region of the collet, since the newly supplied screw must be held there by the screw driving tool in the normal manner by elements of the collet which are resiliently biased.

When, therefore—as in the invention—a rapid movement of the screw driving tool is made possible away from the collet and subsequently back to the collet again, it can be ensured that a new screw can be supplied in the shortest possible time after a screwing procedure has been completed and can be held as a secured, protruding screw between the collet and the screw driving tool. A screw held in this manner is then ready for a new screw driving process.

If now, in accordance with the invention, two different speeds of advance can be provided despite constant speed of rotation of the first threaded element, then, on the one hand, a rapid relative movement between the screw driving tool and the collet is made possible and, on the other hand, it is ensured that the pressing of the screw out of the collet, which is required during the screwing process, takes place with a lower speed of advance and thus adequately slowly, so that a problem-free screwing procedure is ensured.

In accordance with the invention both the rotary movement of the screw driving tool required for the screw driving process and also the feed required for the operation of the automatic screwing device are achieved by a rotation of the first driveable threaded element. The rotating drive of the threaded element can in this respect be effected, for example, by means of an electric motor fed from a power supply or from an accumulator. Thus, in accordance with the invention, it is no longer necessary to use a pneumatic piston-in-cylinder unit or an air motor. The disadvantages which are known from the prior art are thus removed by the invention.

At the same time it is, however, ensured that no penalties have to be tolerated with respect to the operating speed or cycle rate of the automatic screwing device, since, as a result of the two different speeds of advance, an adequately rapid manner of operation of the automatic screwing device can be ensured.

It is preferred when the first threaded element is formed as a threaded spindle (first thread) and the second threaded element is formed as a nut. The nut can, in this case, have an internal thread (first thread) which cooperates with the threaded spindle and an external thread (second thread) which cooperates with a sleeve element, with the sleeve element then having a corresponding internal thread (second thread) and preferably being connected to the collet.

Through a rotation of the threaded spindle, a situation can then be achieved in which the nut, on the one hand, is moved along the axis of the threaded spindle. On the other hand, through a rotation of the nut which takes place jointly with the threaded spindle, for example after the nut running along the spindle has reached its abutment position, a situation can be achieved in which the sleeve element moves along the axis of the nut, which coincides with the axis of the threaded spindle.

If now the thread active between the sleeve element and the nut has a different pitch than the thread active between the threaded spindle and the nut, then different relative speeds can be achieved between the threaded spindle and the sleeve element by a rotary movement of the threaded spindle with a constant speed of rotation. Since the threaded spindle is connected to the screw driving tool and the sleeve element is connected to the collet, different relative speeds are accordingly also achieved between the screw driving tool and the collet.

Since the threaded spindle is, as a rule, fixedly coupled to an electric motor which is arranged in a fixed position in the housing of the automatic screwing device, it is of advantage, in accordance with the invention, when the screw driving tool executes no feed movement relative to the housing of the automatic screwing device, but rather if the collet is instead retracted relative to the screw driving tool. In the end result, this retraction of the collet is the same as a feed movement of the screw driving tool relative to the collet.

Since the path of advance required for the screwing procedure is smaller than the path of advance required for the retraction of the screw driving tool from the region of the collet, it is sensible, in the context of the invention, to make the pitch of the inner thread of the nut or the pitch of the thread of the threaded spindle larger than the pitch of the external thread of the nut or of the internal thread of the sleeve element. The sleeve element and the nut have a smaller axial extent than the threaded spindle, so that with the aforementioned pitch relationships a rapid feed movement can be produced over the relatively large axial extent of the threaded spindle and a comparatively slow feed movement can be produced over the comparatively small axial extent of the nut or sleeve element.

In order to ensure that the nut always first moves along the threaded spindle and the sleeve element is only then moved along the nut, starting from a position in which the nut and the sleeve element are both located in a forward abutment position, or are both located in a rear abutment position, the outer thread of the nut can be more difficult to turn in conjunction with the sleeve element than the inner thread of the nut in conjunction with the threaded spindle. Thus, the nut will always first move into its abutment position relative to the threaded spindle before a relative movement sets in between the nut and the sleeve element.

The above feature can be most simply realized if the threaded spindle is executed as an easily turning ball spindle, and the outer thread of the nut is executed as a fine thread.

In order to control the speed of rotation of the screw driving tool during the screw driving process, the rotary speed of the first threaded element, i.e. of the threaded spindle, can be regulatable, at least during the action of the thread having the smaller pitch, i.e. for example the outer thread of the mut.

The automatic screwing device of the invention is preferably provided with a clutch which serves for the decoupling of the rotary movement of the first threaded element from the thereby produced feed movement. Through such a clutch a situation is achieved in which an axially directed relative movement between the collet and the screw driving tool does not always necessarily take place on a rotation of the first threaded element. The said clutch is in particular so designed that it can bring about a decoupling of the rotary movement and the feed when a screw has been fully pressed out of the collet as a result of a feed movement which previously took place.

No further feed is namely any longer necessary as soon as the screw has been fully released by the collet. It should, however, still be possible to complete the screw driving procedure. As a result, it is advantageous if, in this case, when the screw is no longer held in the collet, a continuation of the screwing process or of the rotary movement of the screw driving tool can take place without the simultaneous production of a relative axial movement between the screw driving tool and the collet. Precisely this is achieved by the said clutch.

The clutch is preferably provided in the already named sleeve element and is in particular realized by means of a first cone and a second cone, the cooperation of which can be cancelled at the instant in which a screw has been fully released by the collet.

The first cone can in this respect be connected to an element of the sleeve, which has the inner thread of the sleeve. In just the same way it is possible to provide the first cone directly with the internal thread of the sleeve.

The second cone, which can be provided radially outside of the first cone, is advantageously connected directly or indirectly to the collet. In this way a situation is achieved in which an axially directed relative movement between the screw driving tool and the collet always takes place when the first cone is in engagement with the second cone, i.e. if the clutch has not been released, as soon as the threaded spindle is set rotating. Only if the first cone has been released from the second cone does a rotation of the threaded spindle bring about no axially directed relative movement between the collet and the screw driving tool. In the last-named case, the rotary movement of the threaded spindle produces only a rotary movement of the screw driving tool, which is, for example, necessary in order to complete a screwing process after the screw has been released from the collet.

It is advantageous if, in the context of the invention, the nut and the sleeve are exchangeable, since in this case different sets of nuts and sleeves can be made available, which can be provided with different thread pitches. These thread pitches between the nut and the sleeve ultimately determine the speed of the axially directed relative movement between the screw driving tool and the collet during the screwing in of a screw. Since, as a result of making available different sets of nuts and sleeves, different speeds can be selected with respect to the said relative movement, it is possible, through the intentional use of a specific nut/sleeve unit, to adapt the speed of the said relative movement to the pitch of the thread of the respectively used screw.

The invention can be used particularly advantageously when a screw supply or a screw magazine is provided for the automatic feeding of screws into the collet, with the screw supply in particular being designed as a pivotable supply channel.

The pivotable supply channel can, with the automatic screwing device formed in this way, always be pivoted into the region of the collet for the purpose of supplying a screw when the screw driving tool has been retracted by the first threaded element, or by the threaded spindle, out of the region of the collet. By a movement of the screw driving tool, which takes place into the region of the collet after the supply of the screw, the supply passage, which is in particular resiliently biased, is pressed by the screw driving tool out of the region of the collet and the screw driving tool comes into engagement with the screw head, whereby the screw is ultimately fixed in the collet.

It is, furthermore, advantageous if a screw magazine is coupled to an automatic screwing device in accordance with the invention in such a way that the supply of a screw from the screw magazine can be triggered through a retraction and subsequent advance of the screw driving tool or through an advance and subsequent retraction of the collet. In particular, it is possible in this way—in similar manner to a magazine principle known in the field of weaponry—to couple in the screw magazine in such a way that a screw supply channel can be freed for the purpose of supplying a screw from the screw magazine by the retraction and subsequent advance of the screw driving tool, or by the advance and subsequent retraction of the collet.

In a preferred method for the operation of an above-described automatic screwing device the screw driving tool and the collet are moved relative to one another between a basic position, a screwing-in position, a first retraction position and a second retraction position.

In the basic position a secured, protruding screw is held in the collet. In the screwing-in position, a tightening of the screw takes place. In the first retraction position, or during the movement from the first retraction position into the second retraction position, a supply of a new screw to the collet takes place.

After the supply of a new screw a movement of the automatic screwing device then takes place, preferably automatically, into its basic position, from which a new screwing process can be initiated with a secured, protruding screw.

With a design of an automatic screwing device with a threaded spindle, nut and sleeve, it is preferable if the spindle and the nut are arranged relative to one another in the basic position in an abutment position, in which the screw driving tool has been moved as far as possible in the direction of the collet. The sleeve is then located relative to the nut in the abutment position in which the distance between the screw driving tool and the collet is still as large as possible. Starting from the basic position, a movement of the screw driving tool can then consequently only take place in the direction of the collet in that the sleeve and the nut are moved relative to one another in a corresponding direction.

It is particularly preferred if, in the basic position, a small movement between the sleeve and the nut has already taken place in the direction in which the screw driving tool is moved in the direction of the collet, since in this way screws with differently sized screw heads can be held in a defined manner in a resiliently pre-stressed collet. The described, relative position between the sleeve and the nut in the basic position namely brings about a situation in which, with differently sized screw heads, the collet is opened up to a greater or lesser degree in accordance with its resilient pre-stress, so that screw heads of different sizes can in any event be firmly held between the collet and the screw driving tool by the resilient pre-stress of the collet.

DETAILED DESCRIPTION OF THE PREFERRED EXEMPLARY EMBODIMENTS

The automatic screwing device shown in FIGS. 1 to 4 is built up as follows:

A motor housing 15 is followed in the axial direction by a guide tube 2, in which there is arranged, amongst other things, a threaded spindle 12 coupled to the motor shaft 17. At the end of the threaded spindle 12 remote from the motor shaft 17 there is provided a tool mount 18 in which a screw driving tool 11 is interchangeably held.

A trigger 16 is arranged on the motor housing 15, by means of which the electric motor, located in the motor housing 15, can be switched on or off.

A nut 13 is screwed onto the threaded spindle 12 and a very easily turnable roller thread is active between the threaded spindle 12 and the nut 13.

The nut 13 is provided, at least in the front region in its outer periphery, with an external thread, onto which a sleeve comprising a first cone 7 and a second cone 6 is screwed. A fine thread is active between the sleeve 6, 7 and the nut 13 and has a smaller pitch than the threaded spindle 12 and is, moreover, at least slightly more difficult to turn than the roller thread, which is active between the threaded spindle 12 and the nut 13.

The sleeve 6, 7 is fixedly connected to a coupling part (i.e. collet guide member) 1, which is executed as a hollow body, in which the tool mount 18, the screw driving tool 11 and the sleeve 6, 7 are guided. The connection between the coupling part 1 and the sleeve 6, 7 is made such that the coupling part 1 can at least participate in the important axial movements of the second outer cone 6 in the axial direction.

A holder for a pivotal arm 5 of a supply passage and also a supply hose 4 is formed at the outer periphery of the coupling part 1.

The pivotal arm 5 is pivotally mounted in the holder 19, so that it is pivotable from a screw supply position into the waiting position and vice versa.

A collet 3 is arranged at the end of the coupling part 1 remote from the sleeve 6, 7 and is resiliently dilatable in order in this manner to release a screw 20 held in the collet 3.

Figure 1:
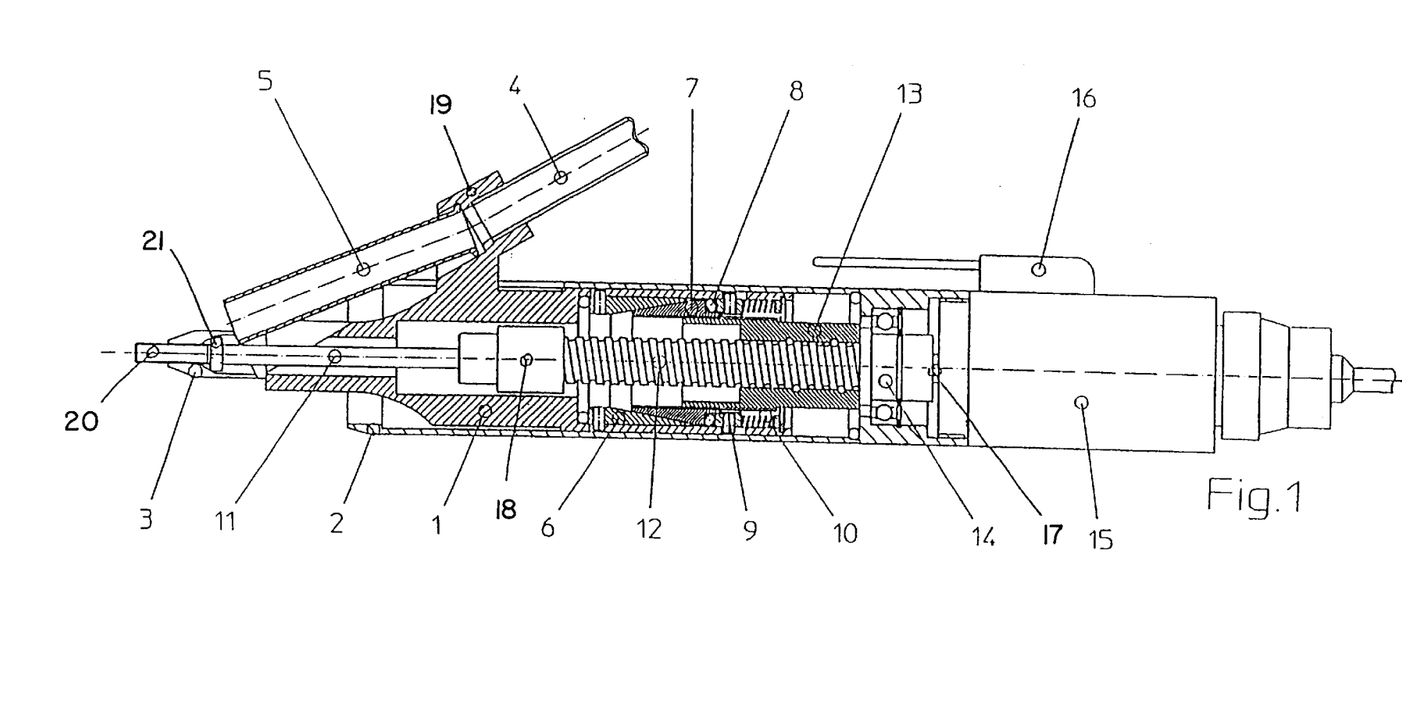
FIG. 1 is a section through an automatic screwing device in accordance with the invention in its basic position.

In the operating position shown in FIG. 1, the screw head 21 is clamped between elements of the collet 3 and the screw driving tool 11 and is fixed in this manner in a defined position.

The precise assembly of that region of the illustrated automatic screwing device, which has the sleeve 6, 7, the nut 13 and the threaded spindle 12, will subsequently be explained with reference to the detailed view of FIG. 2a.

Figure 2:
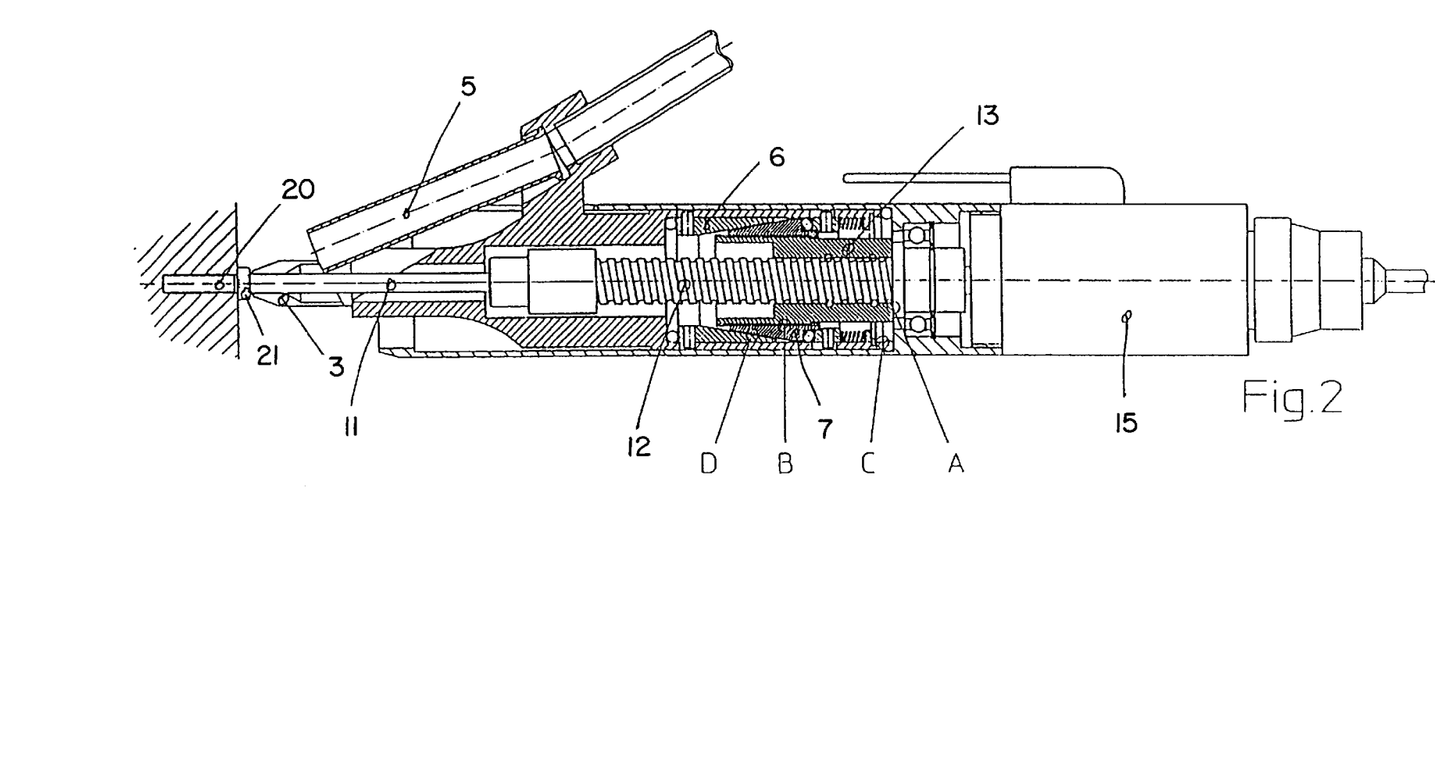
FIG. 2 is a section through an automatic screwing device in accordance with the invention in its screwing-in position.
Figure 2A:
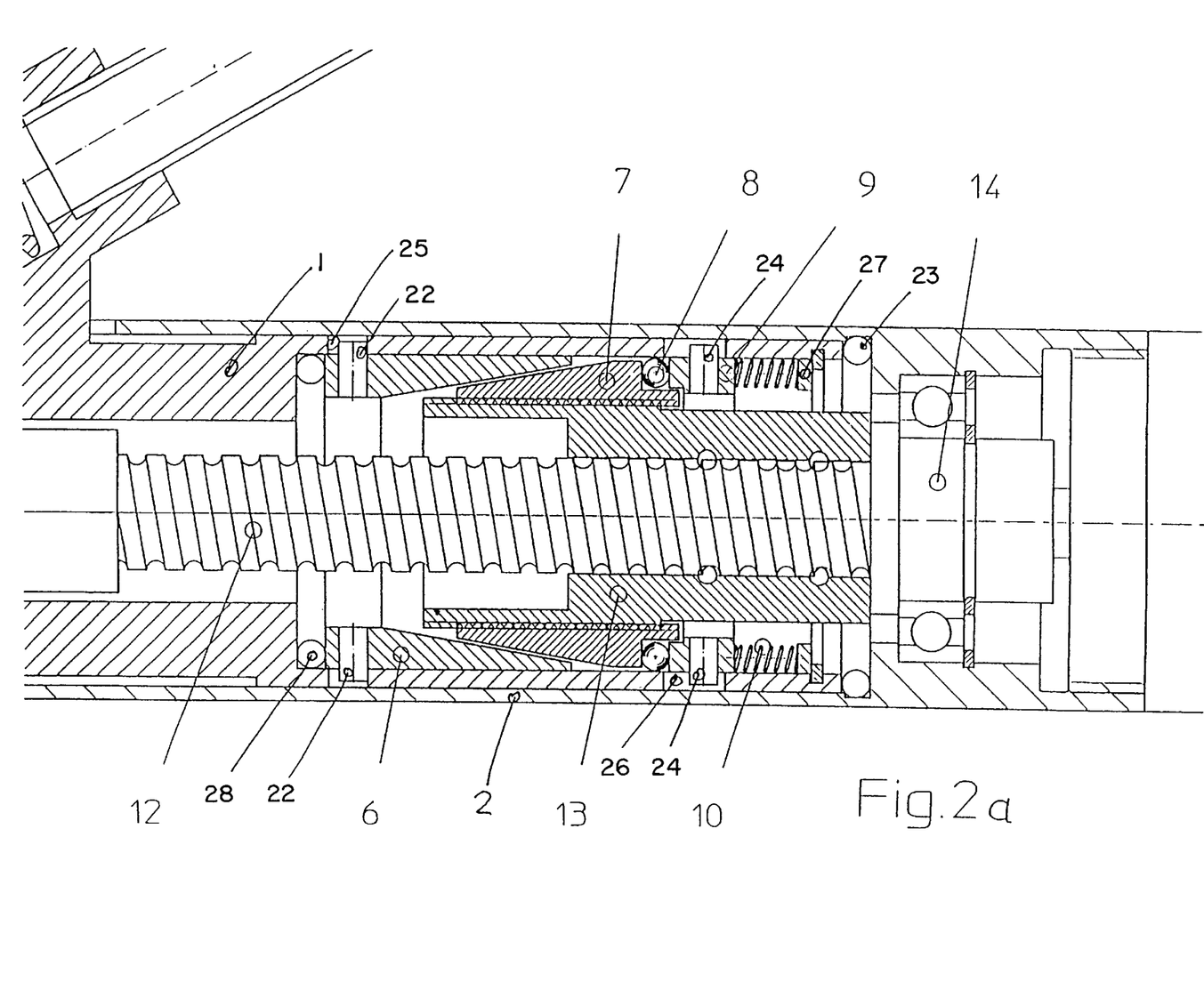
FIG. 2a is a detailed view of FIG. 2.

It is evident from FIG. 2a that the outer cone 6 is provided with first abutment spigots or dogs 22, which project slightly beyond its periphery and which, in the operating position shown in FIG. 2a, abut against walls of apertures 25, with the apertures 25 being formed in that region of the coupling part 1 which surrounds the outer cone 6.

The coupling part 1 extends, however, not only in the axial direction into the region of the outer cone 6, but rather clearly beyond it, in particular up to the O-ring 23, which is arranged in the region of the motor end of the threaded spindle 12. That region of the coupling part 1 which is arranged radially outside of the first cone 6, of the second cone 7, and also outside of the nut 13, can be slidingly displaced in the guide tube 2.

Balls 8 adjoin the motor end of the first and inwardly disposed cone 7 and contact, at their side remote from the cone 7, against an intermediate ring 9, which surrounds the nut 13 and, in a small region, also the cone 7 which is equipped with second abutment spigots or dogs 24 projecting beyond its periphery. The second abutment spigots project into second cutouts 26, which are formed in a region of the coupling part 1 which surrounds the intermediate ring 9. The dimensions of the first and second abutment spigots 22, 24 and also of the cutouts 25, 26 associated with them are selected in such a way that the abutment spigots 22, 24 are movable with clearance in the cutouts 25, 26, with the second abutment spigots 24 having more clearance in the direction of the motor than the abutment spigots 22.

The coupling part 1 is provided at its motor end region with an inwardly projecting abutment ring 27, with compression springs 10 being located between the abutment ring 27 and the intermediate ring 9. Finally, it should be mentioned that a further O-ring 28 is provided at the collet end of the second cone 6. Its side remote from the second cone 6 contacts a correspondingly formed projection of the coupling part 1.

In the screwing-in position of the automatic screwing device shown in FIG. 2a, it must be ensured that a rotation of the screw driving tool is possible without simultaneous axial movement between the screw driving tool 11 and the collet 3. This is achieved in that the first cone 7 is not in engagement with the second cone 6 in this position. On the transition from the basic position into the screwing-in position, the release of the cone 7 from the cone 6 takes place as follows:

First of all, the nut 13 is moved by a rotation of the threaded spindle 12 in the direction of the motor into its position shown in FIG. 2a. Thereafter, a movement of the cone 7 and of the cone 6 takes place, and thus of the coupling part 1 out of the position shown in FIG. 1 in the direction of the motor. During this movement the screw 20 shown in FIG. 1 is pressed out of the collet 3.

Shortly before the termination of this movement, the motor end of the coupling part 1 abuts against the O-ring 23, and at the same time the first abutment spigots 22 come into contact at the boundary walls of the first cutouts 25, as is shown in FIG. 2a. In this position the second abutment spigots 24 are further movable in the direction of the motor against the spring force of the springs 10 in the cutouts 26 associated with them, so that through a further rotation of the threaded spindle 12 a further movement of the first inwardly disposed cone 7 is brought about in the direction of the motor, but with simultaneous blocking of a corresponding movement of the outer second cone. In this way a situation is achieved in which the first cone 7 releases from the second cone 6 and a rotation of the threaded spindle 12 is possible, without the coupling part 1 moving in the axial direction.

When the direction of rotation of the threaded spindle 12 is reversed in the following, in order to reach the operating position of FIG. 3, the nut 13 is first moved together with the first cone 7 in the direction of the collet 3, i.e. also in the direction of the second cone 6, whereby the first cone 7 comes into contact with the second cone 6. A firm clamping of the first cone 7 and the second cone 6 thereby takes place, so that, in distinction to the screwing-in position shown in FIG. 2a, no relative rotary movement is possible between the first cone 7 and the second cone 6.

When the cone 7 and the cone 6 are in engagement with one another, a rotary movement of the threaded spindle 12 basically always initiates an axial movement of the coupling part 1 and thus of the collet 3.

In the following, an operating cycle of an automatic screwing device in accordance with the invention will be explained with reference to the operating positions in accordance with FIGS. 1 to 4.

In FIG. 1 the basic position is shown with a secured, protruding screw 20, with the secured protruding screw 20 being held by the screw driving tool 11 in the collet 3. The nut 13 is located in its rear abutment position, the sleeve 6, 7 in its front abutment position.

By actuating the trigger 16, the threaded spindle 12 is set in rotation in such a way that the sleeve 6, 7 is moved in the direction of the motor housing 15 and, through the rotation of the threaded spindle 12, a rotation of the screw driving tool 11 is caused simultaneously. During this procedure the collet 3 is retracted relative to the screw driving tool 11, with simultaneous rotation of the screw 20, until finally the screw head 21 is released. Then the automatic screwing device is located in the operating position in accordance with FIG. 2, which corresponds to the screwing-in position.

In the screwing-in position it is possible, as was already explained above with reference to FIG. 2a, to turn the screw 20 further without simultaneously bringing about an axial relative movement between the collet 3 and the screw driving tool 11.

In the screwing-in position illustrated in FIG. 2 both the nut 13 and also the sleeve 6, 7 are located in their rear abutment position.

After the termination of the screwing-in procedure, the direction of rotation of the threaded spindle 12 is switched over, and the nut 13 is first moved into its front abutment position. The sleeve 6, 7 initially remains in its rear abutment position.

Through the said rotary movement of the threaded spindle 12 a situation is achieved in which the coupling part 1, i.e. the collet 3, is moved forwardly, away from the screw driving tool 11, which is the same as a retraction of the screw driving tool 11 relative to the collet 3.

Figure 3:
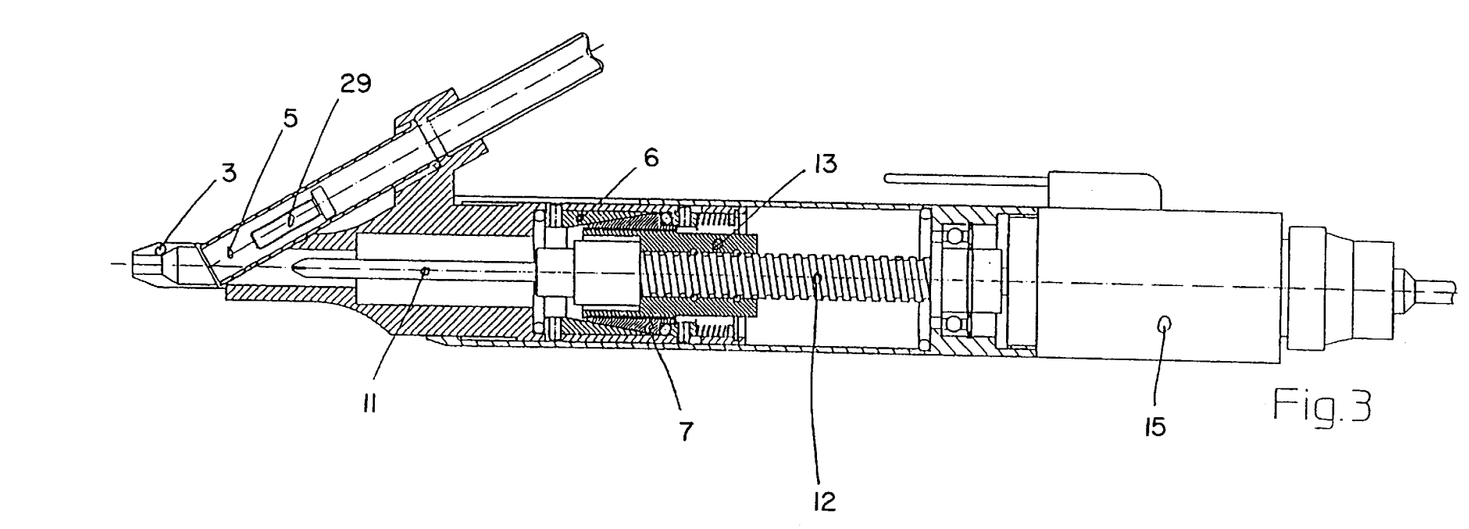
FIG. 3 is a section through an automatic screwing device in accordance with the invention in a first retraction position.

The screw driving tool 11 is retracted sufficiently far in this way, i.e. the collet 3 is advanced forwardly sufficiently far that the pivotal arm 5 can pivot into the region of the collet 3, as is shown in FIG. 3. During the displacement of the collet 3 out of the position shown in FIG. 2 into the position shown in FIG. 3, the contact between the screw driving tool 11 and the pivotal arm 5 is consequently cancelled, so that the pivotal arm 5 can pivot in accordance with its resilient bias into the region of the collet 3. In this manner it is possible to supply a new screw 29.

During the supply of the new screw 29 the threaded spindle rotates further with unchanged direction of rotation, whereby a movement of the sleeve 6, 7 into its front abutment position is brought about, which is the same as a further shift of the collet 3. This brings about a significant saving in time, since the relative position between the sleeve 6, 7 and the nut 13 now already corresponds to the basic position of FIG. 1, and the time for movement into the basic position can be exploited in order to supply a new screw 29.

Figure 4:
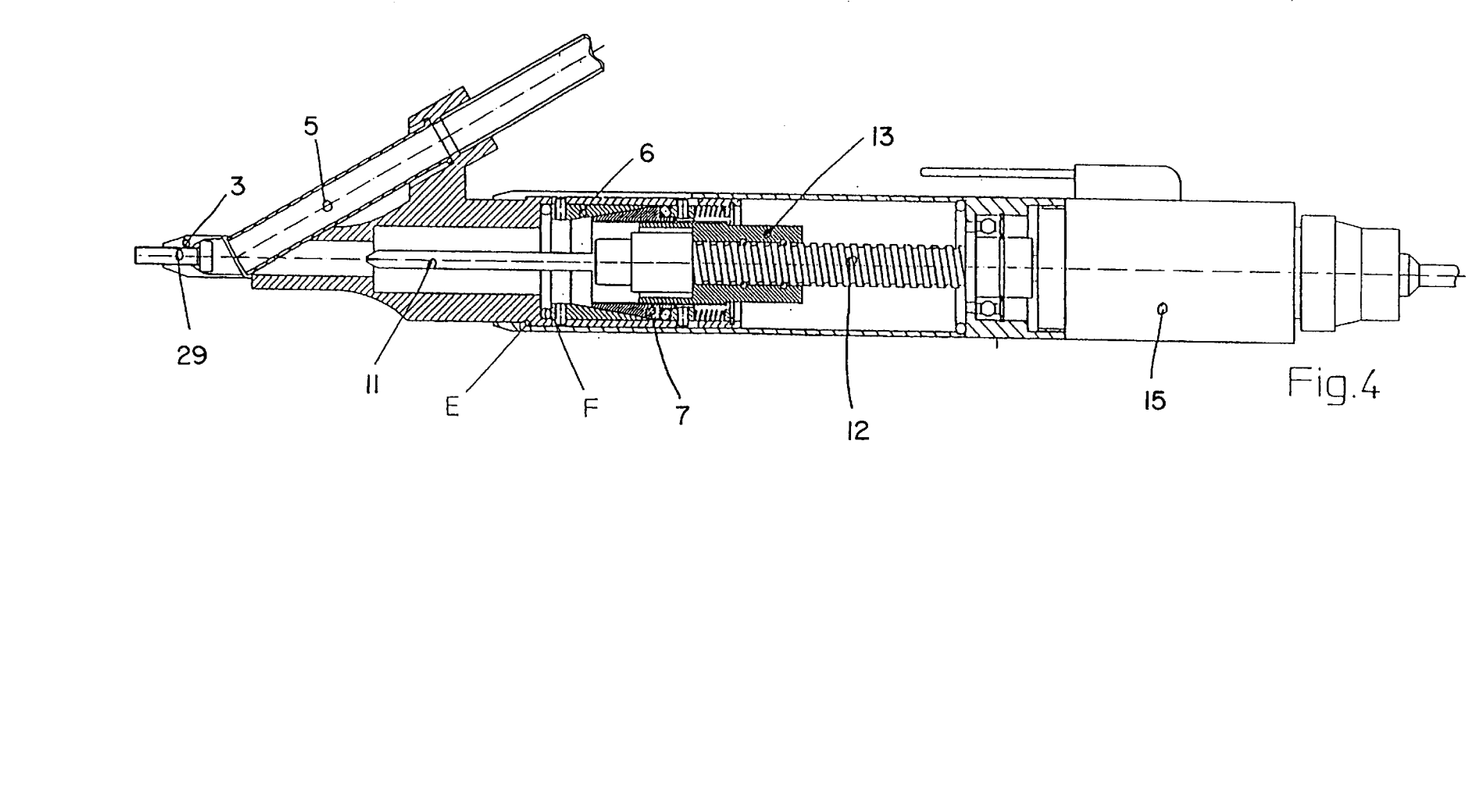
FIG. 4 is a section through an automatic screwing device in accordance with the invention in a second retraction position.

In the operating position shown in FIG. 4, in which a new screw 29 was supplied, both the sleeve 6, 7 and also the nut 13 are located in their respective front abutment position.

In this position, a reversal of the direction of rotation of the threaded spindle 12 again takes place automatically and results in the nut 13 moving into its rear abutment position in accordance with FIG. 1, so that the new screw 29 is now held between the screw driving tool 11 and the collet 3. In this operating position, which corresponds to the basic position of FIG. 1, a new screwing procedure can begin for the screwing in of the screw 29.

With the movement of the collet 3 relative to the screw driving tool 11 out of the retraction position shown in FIG. 4 into the basic position shown in FIG. 1, a contact takes place between the screw driving tool 11 and the pivotal arm 5, which ultimately leads to the pivotal arm 5 being pivoted out of the region of the collet 3 into its position shown in FIG. 1. In this manner a situation is reached in which the region of the collet 3 is freely accessible for the screw driving tool 11.

With respect to the above-explained manner of operation of an automatic screwing device in accordance with the invention, it should be remarked that after each reversal of the direction of rotation of the threaded spindle 12, an axial movement of the nut 13 together with the sleeve 6, 7 first takes place, in which the relative position between the nut 13 and the sleeve 6, 7 does not change, whereupon a movement of the sleeve 6, 7 relative to the nut 13 finally takes place, during which the nut 13 no longer executes an axial movement. This sequence of movement is achieved in that the thread between the threaded spindle 12 and the nut 13 is easier to turn than the thread between the nut 13 and the sleeve 6, 7.

The invention is not restricted to the above-described embodiments and manners of operation. Many other embodiments and manners of operation can still be realized.

What is claimed is:

1. A motor-driven screwdriver comprising:
   a housing having an axial direction;
   a shaft within said housing;
   a reversible drive motor at said housing and adapted to drive said shaft;
   a screw driving tool connected to said shaft;
   a collet for holding a screw;
   a collet guide member disposed for axial movement with said collet relative to said housing and said screw driving tool; and
   a thread transmission disposed between said shaft and said collet guide member and adapted to produce relative axial movement of said collet guide member with said collet relative to said housing and said screw driving tool during rotation of said shaft and said screw driving tool,
   wherein said thread transmissions comprises a first threaded element formed on said shaft and at least one second threaded element which stands in working engagement with the first threaded element and acts on said collet guide member; and
   wherein first and second cooperating thread pairs are provided in said thread transmission, said first cooperating thread pair having a first thread pitch and said second cooperating thread pair having a second thread pitch different from said first thread pitch, whereby to produce two different speeds of axial movement of said collet relative to said screw driving tool for a constant speed of rotation of said first threaded element.

2. The motor-driven screwdriver in accordance with claim 1, wherein said first threaded element comprises said shaft which is formed as a threaded spindle.

3. The motor-driven screwdriver in accordance with claim 2, wherein said second threaded element comprises a nut having a first thread which cooperates with said threaded spindle to form said first cooperating thread pair.

4. The motor-driven screwdriver in accordance with claim 3, wherein said threaded spindle comprises a ball spindle and said nut has a roller thread cooperating with said ball spindle.

5. The motor-driven screwdriver in accordance with claim 3, wherein said nut has a second thread having a pitch different from that of said first thread, and wherein said collet guide member includes an element having a mating thread which cooperates with said second thread of said nut to form said second cooperating thread pair.

6. The motor-driven screwdriver in accordance with claim 5, and further comprising a clutch disposed between said collet guide member and said nut, said clutch being disengageable in a retracted position of said collet guide member relative to said screw driving tool to permit rotation of the said screw driving tool without axial movement of said collet guide member.

7. The motor-driven screwdriver in accordance with claim 6, wherein said clutch comprises a cone clutch.

8. The motor-driven screwdriver in accordance with claim 7, wherein said cone clutch comprises a first cone connected to said collet guide member for rotation together therewith and a second cone having said mating thread and movable with said nut into and out of engagement with said first cone.

9. The motor-driven screwdriver in accordance with claim 8, wherein said second thread of said nut comprises an outer thread and said mating thread on said second cone comprises an internal thread.

10. The motor-driven screwdriver in accordance with claim 8, wherein said first pitch is greater than said second pitch.

11. The motor-driven screwdriver in accordance with claim 7, wherein said first cone is disposed within a sleeve of said collet guide member for rotation therewith but is capable of limited axial movement relative thereto.

12. The motor-driven screwdriver in accordance with claim 11, including an abutment ring mounted for rotation with said collet guide member and a plurality of balls disposed between said second cone member and said abutment ring.

13. The motor-driven screwdriver in accordance with claim 12, wherein said abutment ring includes radially projecting spigots which engage in cut-outs provided in said sleeve of said collet guide member, said spigots and said cut-outs permitting restricted axial relative movement between said abutment ring and said collet guide member.

14. The motor-driven screwdriver in accordance with claim 13, wherein said restricted axial movement of said abutment ring relative to said collet guide member is greater than said restricted axial movement of said first cone member relative to said collet guide member.

15. The motor-driven screwdriver in accordance with claim 14, wherein spring means is provided for biasing said abutment ring towards said second cone member.

16. The motor-driven screwdriver in accordance with claim 15, wherein said spring means comprises at least one compression coil spring disposed between said abutment ring and a retaining ring provided in said sleeve of said collet guide member on a side of said abutment ring remote from said second cone member.

17. The motor-driven screwdriver in accordance with claim 1, wherein a tool mount is provided at an end of said shaft remote from said reversible motor for interchangeably holding said screw driving tool.

18. The motor-driven screwdriver in accordance with claim 6, wherein at least said nut and said clutch are interchangeable.

19. The motor-driven screwdriver in accordance with claim 1 and further comprising a screw supply for feeding screws into said collet.

20. The motor-driven screwdriver in accordance with claim 19, wherein said screw supply comprises a screw supply passage extending through said collet guide member and wherein said screw driving tool prevents movement of a screw through said screw supply passage when said collet is retracted relative to said screw driving tool and frees said screw supply passage when said collet is extended relative to said screw driving tool.

21. The motor-driven screwdriver in accordance with claim 20, wherein said screw supply comprises a screw magazine.

22. The motor-driven screwdriver in accordance with claim 20, wherein said screw supply comprises a supply passage pivotally connected to said collet guide member.

23. The motor-driven screwdriver in accordance with claim 20, wherein said screw supply comprises a supply passage pivotally connected to said collet guide member.

24. The motor-driven screwdriver in accordance with claim 4, wherein a threaded connection provided between said threaded spindle and said nut is easier to turn than a threaded connection between said second thread and said mating thread.

25. A motor-driven screwdriver comprising:
housing having an axial direction;
a shaft within said housing;
a reversible drive motor at said housing and adapted to drive said shaft;
a screw driving tool connected to said shaft;
a collet for holding a screw;
a collet guide member disposed for axial movement with said collet relative to said housing and relative to said screw driving tool; and
a thread transmission disposed between said shaft and said collet guide member and adapted to produce said axial movement of said collet guide member and said collet relative to said housing and relative to said screw driving tool during rotation of said shaft and said screw driving tool.

26. The motor-driven screwdriver in accordance with claim 25 and further comprising a running nut in said thread transmission and a clutch disposed between said collet guide member and said running nut, said clutch being disengageable in a retracted position of said collet guide member relative to said screw driving tool to permit rotation of said screw driving tool without relative axial movement of said collet guide member.

27. A method for the operation of a motor-driven screwdriver comprising:
a housing having an axial direction;
a shaft within said housing;
a reversible drive motor at said housing and adapted to drive said shaft;
a screw driving tool connected to said shaft;
a collet for holding a screw;
a collet guide member disposed or axial movement with said collet relative to said housing and said screw driving tool; and
a thread transmission disposed between said shaft and said collet guide member and adapted to produce relative axial movement of said collet guide member with said collet relative to said housing and said screw driving tool during rotation of said shaft and said screw driving tool;

wherein said thread transmission comprises a first threaded element formed on said shaft and at least one second threaded element which stands in working engagement with the first threaded element and acts on said collet guide member; and wherein first and second cooperating thread pairs are provided in said thread transmission, said first cooperating thread pair having a first thread pitch and said second cooperating thread pair having a second thread pitch different from said first thread pitch, said second cooperating thread pair comprising a nut adopted to run on said second thread element and is connectable to said collet guide member via a clutch, whereby to produce two different speeds of axial movement of said collet relative to said screw driving tool for a constant speed of rotation of said first threaded element, wherein the method comprises the steps of:
a) retracting said collet and collet guide member from a basic position, in which said screw driving tool contacts a screw present in said collet, into a screwing in position in which said collet is retracted relative to said screw driving tool and said screw has been expelled from said collet and engages into a workpiece;
b) advancing said collet and said collet guide member at a first speed out of said screwing in position into a first extended position of said collet in which said collet is axially spaced from said screw driving tool for insertion of a screw into said collet;
c) advancing said collet and said collet guide member at a second speed slower than said first speed from said first extended position into a second further extended position; and
d) retracting said collet and said collet guide member from said second extended position back into said basic position.

28. The method in accordance with claim 27, wherein a supply of a screw to said collet is effected in said first extended position.

29. The method in accordance with claim 27, wherein a supply of a screw into said collet is effected during movement from said first extended position to said second extended position.

30. The method in accordance with claim 27, wherein said motor-driven screwdriver is stopped in said basic position.

31. The method in accordance with claim 27, wherein, after tightening of a screw, the collet is automatically moved relative to the screw driving tool into said first extended position and into the second extended position and then into the basic position.

32. The method in accordance with claim 27, wherein the movement of step a) is effected by rotation of said motor in a screw inserting direction utilizing said first cooperating thread pair to move said nut along said spindle to a first end position in which said clutch disengages said nut from said collet guide member,
wherein said rotation is continued after disengagement of said clutch to completed insertion of said screw.

33. The method in accordance with claim 32, wherein the direction of rotation is reversed after insertion of said screw in order to carry out step b) by utilising said first cooperating thread pair to move said nut along said threaded spindle at said first speed to a second end position remote from said first and corresponding to said first extended position while engaging said clutch.

34. The method in accordance with claim 33, wherein the rotation is continued in the same direction utilizing said second thread pair to move said collet guide member axially relative to said nut at said second speed to carry out step c) and reach said second extended position.

35. The method in accordance with claim 34, wherein the direction of rotation is reversed after reaching said second end position in order to utilize the first cooperating thread pair to carry out step d) and move the collet guide member with said nut to said first end position.

* * * * *